United States Patent
Russ et al.

(10) Patent No.: US 9,577,772 B2
(45) Date of Patent: Feb. 21, 2017

(54) MEASURING DEVICE AND MEASURING METHOD FOR DYNAMICALLY MEASURING CARRIER AGGREGATION SIGNALS

(71) Applicant: Rohde & Schwarz GmbH & Co. KG, Munich (DE)

(72) Inventors: Stefan Russ, Haar (DE); Wolfgang Bleichner, Peiting (DE); Anne Stephan, Taufkirchen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/741,765

(22) Filed: Jun. 17, 2015

(65) Prior Publication Data

US 2016/0254871 A1 Sep. 1, 2016

Related U.S. Application Data

(60) Provisional application No. 62/121,651, filed on Feb. 27, 2015.

(51) Int. Cl.
*H04B 17/00* (2015.01)
*H04B 17/29* (2015.01)

(52) U.S. Cl.
CPC .......... *H04B 17/29* (2015.01); *H04B 17/0085* (2013.01)

(58) Field of Classification Search
CPC ....... H04W 24/00; H04W 24/08; H01Q 3/267; H04B 17/0085; H04B 17/004; H04B 17/0042; H04B 17/0057; H04L 1/0026
USPC ..................... 455/67.11–67.14, 115.1–115.4, 455/226.1–226.4, 423
See application file for complete search history.

(56) References Cited

U.S. PATENT DOCUMENTS

| | | | |
|---|---|---|---|
| 9,263,793 B2* | 2/2016 | Dupuy | H01Q 1/50 |
| 2005/0237163 A1* | 10/2005 | Lee | G06K 19/0723 340/10.51 |
| 2014/0029440 A1* | 1/2014 | Genoud | H04L 5/001 370/241 |
| 2015/0177315 A1* | 6/2015 | Lim | G01R 21/10 702/108 |

OTHER PUBLICATIONS

Kottkamp, "Testing LTE-Advanced Application Note", Rohde & Schwarz, Nov. 1, 2012, Nov. 1, 2012.

* cited by examiner

*Primary Examiner* — Nhan Le
(74) *Attorney, Agent, or Firm* — Potomac Technology Law, LLC

(57) ABSTRACT

A measuring device for measuring a response of a device under test to a carrier aggregation signal is provided. The measuring device comprises a signal generator configured to generate the carrier aggregation signal, which comprises a first carrier signal and/or a second carrier signal. The measuring device comprises a control unit configured to control the signal generator to user-selectably, individually and dynamically, activate and deactivate the carrier signals within the carrier aggregation signal.

18 Claims, 15 Drawing Sheets

MEASURING DEVICE AND MEASURING METHOD FOR DYNAMICALLY MEASURING CARRIER AGGREGATION SIGNALS

RELATED APPLICATIONS

This application claims the benefit of the earlier filing date under 35 U.S.C. §119(e) of U.S. Provisional Application Ser. No. 62/121,651 (filed 2015 Feb. 27).

TECHNICAL FIELD

The invention relates to testing LTE-Advanced Carrier Aggregation receiver characteristics, especially for testing the ability of a mobile communications device under test to handle a carrier aggregation signal comprising more than one carrier.

BACKGROUND

Long Term Evolution Advanced (LTE-Advanced) (3GPPP LTE Release 10 & beyond) is a $4^{th}$ Generation (4G) mobile communication system enhancing the basic LTE technology specified in 3GPP Release 8. Carrier Aggregation (CA) is among the multiple features introduced with LTE-Advanced. In order to increase bandwidth and thereby bitrate, an LTE-Advanced capable terminal or user equipment (UE) can be allocated downlink (DL) and uplink (UL) aggregated resources comprising two or more carriers, wherein aggregated carriers are referred to as Component Carriers (CC).

Three different modes of CA are defined within LTE-Advanced: (1) intra-band contiguous CA; (2) intra-band non-contiguous CA; and (3) inter-band CA. Intra-band CA relates to carrier aggregation wherein the component carriers belong to the same operating frequency band. For contiguous CA, contiguous component carriers are allocated while for non-contiguous CA carriers are allocated with one or more gaps between them. In case of inter-band CA, the component carriers belong to different operating frequency bands.

A component carrier can have a bandwidth of 1.4, 3, 5, 10, 15 or 20 Megahertz (MHz) and it is envisaged that a maximum of five component carriers can be aggregated, resulting in a maximum aggregated bandwidth of 100 MHz instead of at most 20 MHz without CA. However, according to Release 11 the maximum number of carriers in DL is 2, i.e. 2DL CA and therefore maximum aggregated bandwidth is 40 MHz. As an example, 3GPP TS 36.101 version 11.6.0 Release 11 may be consulted for further details on required UE transmission and reception characteristics.

It is envisaged that more than two, i.e. three downlink carrier aggregation (3DL CA), four downlink carrier aggregation (4DL CA), or five downlink carrier aggregation (5DL CA) will be introduced in the next releases to come. Current implementations are also restricted to one UL carrier, i.e. no CA on UL, while 2UL CA systems can be contemplated for future releases.

UEs can be said to support a specific functionality in case they have been tested accordingly to verify proper functioning. 3GPP TS 36.508 version 11.2.0, for example, defines a common test environment for UE conformance testing in Release 11 and 3GPP TS 36.521-1 version 11.2.0, Release 11 defines UE conformance specifications for radio transmission and reception for conformance testing including measurement procedures for the conformance tests. Test cases are defined for testing UE capabilities such as reference sensitivity level, maximum input level, adjacent channel selectivity, blocking characteristics, etc., wherein test cases are defined without taking the CA feature into account, i.e. a single carrier is established only, while other test cases measure the UE capabilities when CA is active, i.e. for 2DL CA in case of Release 11.

When performing state of the art carrier aggregation tests, so far, the entire test case had to be prepared beforehand. This means that the number of carriers, the protocols state of the individual carriers, the frequency bandwidth, etc. of the carriers all had to be set in advance, before the actual measurement could begin. This resulted in a low flexibility, since an operator of the measuring device could not on the fly change any of these settings without stopping the measurement and initiating a new measurement afterwards.

For example, the US-Patent Publication US 2014/0029440 A1 shows a state of the art carrier aggregation testing method and apparatus. This method and apparatus shows the above-mentioned disadvantages.

There is a need, therefore, for an approach that provides a measuring device and method, which allow for a very flexible measurement of the response of a device under test to carrier aggregation signals.

SUMMARY OF EXAMPLE EMBODIMENTS

Embodiments of the present invention advantageously address the foregoing requirements and needs, as well as others, by providing an approach for a measuring device and method, which allow for a very flexible measurement of the response of a device under test to carrier aggregation signals.

According to example embodiments of the invention, a measuring device for measuring a response of a device under test to a carrier aggregation signal is provided. The measuring device comprises a signal generator configured to generate the carrier aggregation signal, which comprises a first carrier signal and/or a second carrier signal. The measuring device comprises a control unit configured to control the signal generator to selectably, individually and dynamically, activate and deactivate the carrier signals within the carrier aggregation signal. It is thereby possible to alter the settings of the individual carriers during a measurement. This allows for a very flexible and fast measuring.

According to a first such embodiment, the control unit is configured to control the signal generator to selectably and individually activate and deactivate the carrier signals within the carrier aggregation signal during a measurement without completely deactivating the carrier aggregation signal. An increase of the measuring speed can thereby be achieved.

According to a second such embodiment, the control unit is configured to control the signal generator to selectably, individually and dynamically, set protocols states and/or parameters of the carrier signals within the carrier aggregation signal. A further increase in measuring flexibility can thereby be achieved. By way of example, the control unit is configured to control the signal generator to selectably and individually set the protocol states and/or parameters of the carrier signals within the carrier aggregation signal during a measurement without completely deactivating the carrier aggregation signal. Also by this measure, an increase a measuring speed can be achieved.

According to a third such embodiment, the carrier aggregation signal is an LTE signal or an LTE-advanced signal. The protocol states of the carrier signals are "off", "on", "RRC added", "MAC activated". It is thereby possible to easily and quickly perform measurements on LTE and LTE advanced signals.

According to a fourth such embodiment, the measuring device comprises an input unit, preferably a touch screen and/or a mouse and/or a keyboard, configured to accept user input. The control unit is configured to control the signal generator based upon the user input. An especially simple measuring process is thereby possible.

According to a fifth such embodiment, the measuring device comprises a display. The control unit is configured to control the display to display status information regarding at least one of the carrier signals and/or information regarding a current user input. A further increase in usability can thereby be achieved. By way of example, the control unit is configured to selectably switch between controlling the display to display status information regarding one of the carrier signals and controlling the display to display aggregated status information regarding all carrier signals. A very flexible handling of the measuring device is thereby possible.

According to a sixth such embodiment, the first carrier signal comprises a first parameter set and the second carrier signal comprises a second parameter set. The first parameter set and the second parameter set each comprise a carrier frequency and/or a carrier bandwidth and/or a carrier modulation scheme and/or a channel number. The control unit is configured to control the signal generator to selectably exchange at least part of the first parameter set of the first carrier and at least part of the second parameter set of the second carrier. It is thereby very easily possible to switch between different parameter sets for the different carrier signals. This further increases the usability.

According to a seventh such embodiment, the measuring device comprises a communication unit configured to communicate with the device under test and receive measuring results from the device under test. The control unit is configured to control the display to display the measuring results provided by the device under test. It is thereby possible to omit a further control PC and perform the entire measurement only using the measuring device.

According to an eighth such embodiment, the carrier aggregation signal comprises a first carrier signal and/or a second carrier signal and/or a third carrier signal.

According to a ninth such embodiment, the carrier aggregation signal optionally additionally comprises a fourth carrier signal. A further increase in measuring flexibility can thereby be achieved.

According to further example embodiments of the invention, a measuring method for measuring a response of a device under test to a carrier aggregation signal is provided. The carrier aggregation signal comprises a first carrier signal and/or a second carrier signal. The measuring method comprises generating the carrier aggregation signal and selectably, individually and dynamically activating and deactivating the carrier signals within the carrier aggregation signal. A high measuring flexibility can thereby be achieved.

According to a first such further embodiment, the method comprises selectably and individually activating and deactivating the carrier signals within the carrier aggregation signal during a measurement without completely deactivating the carrier aggregation signal. Thereby a further increase in measuring speed can be achieved.

According to a second such further embodiment, protocol states and/or parameters of the carrier signals within the carrier aggregation signal can be selectably, individually and dynamically set. A further increase in measuring flexibility can thereby be achieved.

According to a second such further embodiment, the carrier aggregation signal is an LTE-signal or an LTE-advanced signal. The protocol states of the carrier signals are "off", "on", "RRC added", "MAC activated". It is thereby possible to easily and quickly perform measurements on LTE and LTE advanced signals.

According to a fourth such further embodiment, the method comprises accepting user input, for example by a touch screen and/or a mouse and/or a keyboard. Moreover the method comprises generating the carrier aggregation signal based upon this user input. An especially simple measuring process is thereby possible.

According to a fifth such further embodiment, the method comprises displaying status information regarding at least one of the carrier signals and/or information regarding a current user input on a display. A further increase in usability can thereby be achieved. By way of example, the method comprises selectably switching between displaying status information regarding one of the carrier signals and displaying aggregated status information regarding all carrier signals. A very flexible handling of the measuring device is thereby possible.

According to a sixth such further embodiment, the first carrier signal comprises a first parameter set and the second carrier signal comprises a second parameter set. The first parameter set and the second parameter set each comprise a carrier frequency and/or a carrier bandwidth and/or a carrier modulation scheme and/or a channel number. The method comprises selectably exchanging at least part of the first parameter set of the first carrier signal and at least part of the second parameter set of the second carrier signal. It is thereby very easily possible to switch between different parameter sets for the different carrier signals. This further increases the usability.

According to a seventh such further embodiment, the measuring method comprises communicating with the device under test and receiving measuring results from the device under test. The method then comprises displaying the measuring results provided by the device under test. It is thereby possible to omit a further control PC and perform the entire measurement only using the measuring device.

According to an eighth such further embodiment, the carrier aggregation signal comprises a first carrier signal and/or a second carrier signal and/or a third carrier signal.

According to a ninth such further embodiment, the carrier aggregation signal optionally additionally comprises a fourth carrier signal. A further increase in measuring flexibility can thereby be achieved.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings and in which like reference numerals refer to similar elements, and in which:

FIG. 5 illustrates a third example of the content of a display of the measuring device, in accordance with example embodiments of the present invention;

FIG. 9 illustrates a sixth example of the content of a display of the measuring device, in accordance with example embodiments of the present invention;

DETAILED DESCRIPTION

A system and method for data transmissions in a satellite communications system, which accommodates for a periodic short duration blockage of the transmission signal to and from a satellite terminal, without packet loss due to the transmission blockages, while employing a relatively simple FEC data recovery scheme, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1:
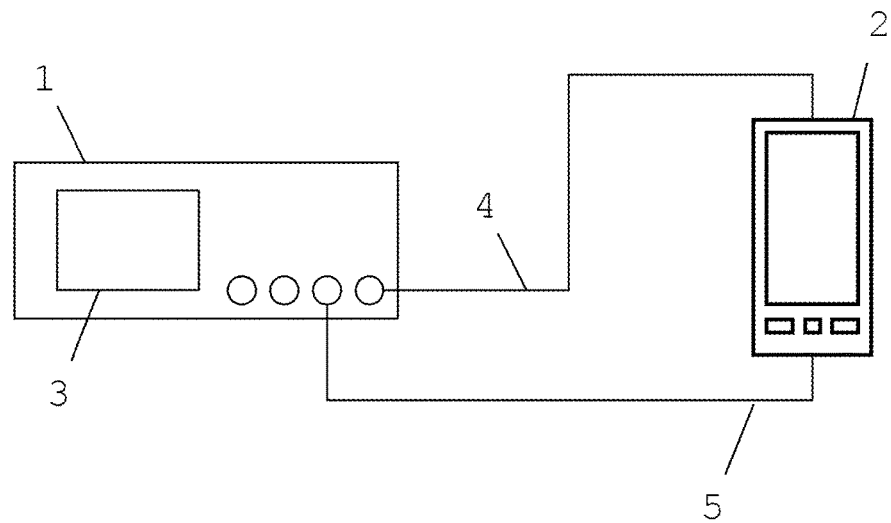
FIG. 1 illustrates a block diagram of a first configuration of a measuring device and a device under test, in accordance with example embodiments of the present invention.

FIG. 1 illustrates a block diagram of a first configuration of a measuring device and a device under test, in accordance with example embodiments. The measuring device 1 comprises a display 3. The measuring device 1 is connected to a device under test 2. In this example, the measuring device 1 is connected to the device under test 2 by use of two connections 4, 5. By way of example, the measuring device 1 is connected to the device under test 2 by a high-frequency connection 4. By way of further example, instead of a wired high frequency connection 4, also a signal transmission over-the-air is possible. Further, the measuring device 1 is connected to the device under test 2 by a data connection 5. Alternatively, also a transmission of data through a wireless channel is possible.

According to one embodiment, for performing a measurement, the measuring device 1 generates a carrier aggregation signal and transmits it to the device under test 2 through the connection 4. The device under test 2 receives the carrier aggregation signal, processes it and returns measuring results over the data connection 5 to the measuring device 1. The measuring results can be displayed on the display 3. Moreover, measuring settings can also be displayed on the display 3. Further details regarding the measuring device 1 are provided below with reference to FIG. 2-FIG. 15.

Figure 2:
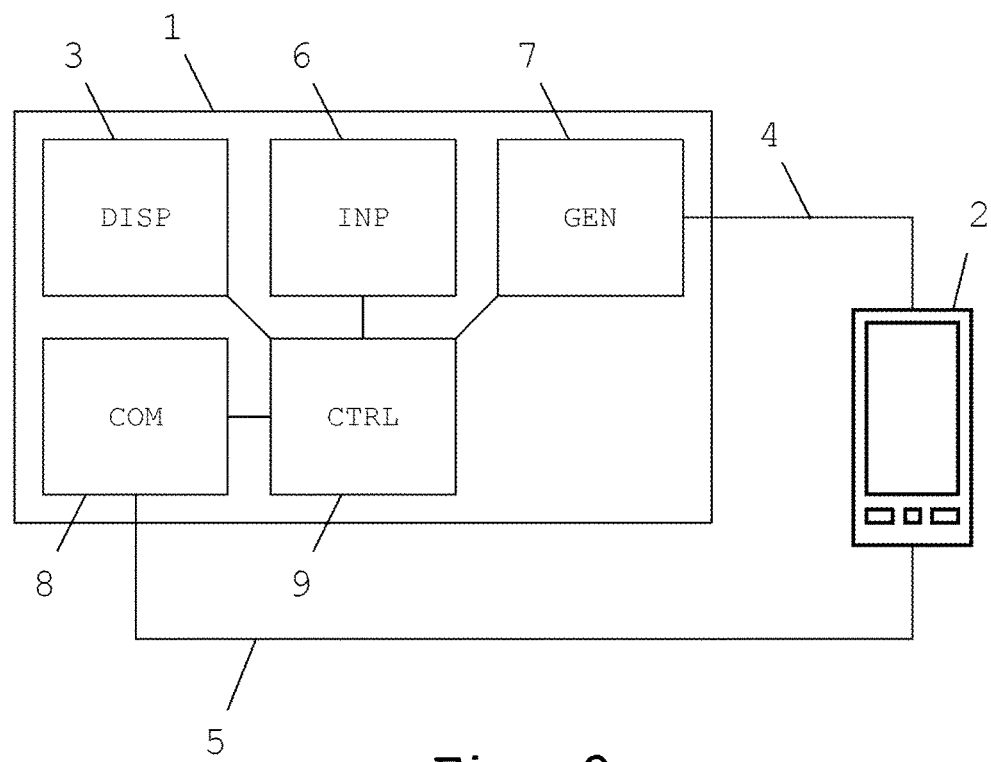
FIG. 2 illustrates a block diagram of a second configuration of a measuring device and a device under test, in accordance with example embodiments of the present invention.

FIG. 2 illustrates a block diagram of a second configuration of a measuring device and a device under test, in accordance with example embodiments. Here, the inner configuration of the measuring device 1 are shown in a block diagram. The measuring device 1 comprises the above-described display 3, an input unit 6, a signal generator 7, a communication unit 8 and a control unit 9. By way of example, all of the units 3, 6, 7, 8 are individually connected to the control unit 9 and are controlled by the control unit 9. The input unit 6 facilitates user input selections and settings. The input unit 6 can for example be a touch screen, a keyboard, a mouse or any combination of the same. The communication unit 8 facilitates a communication connection 5 between the device under test 2 and the measuring device 1. The signal generator 7 generates the carrier aggregation signal, which is provided to the device under test 2. The carrier aggregation signal is generated under control of the control unit 9. The carrier aggregation signal comprises one or more, which can be intra-band contiguous, intra-non-contiguous and intra-band carrier signals.

Figure 8:
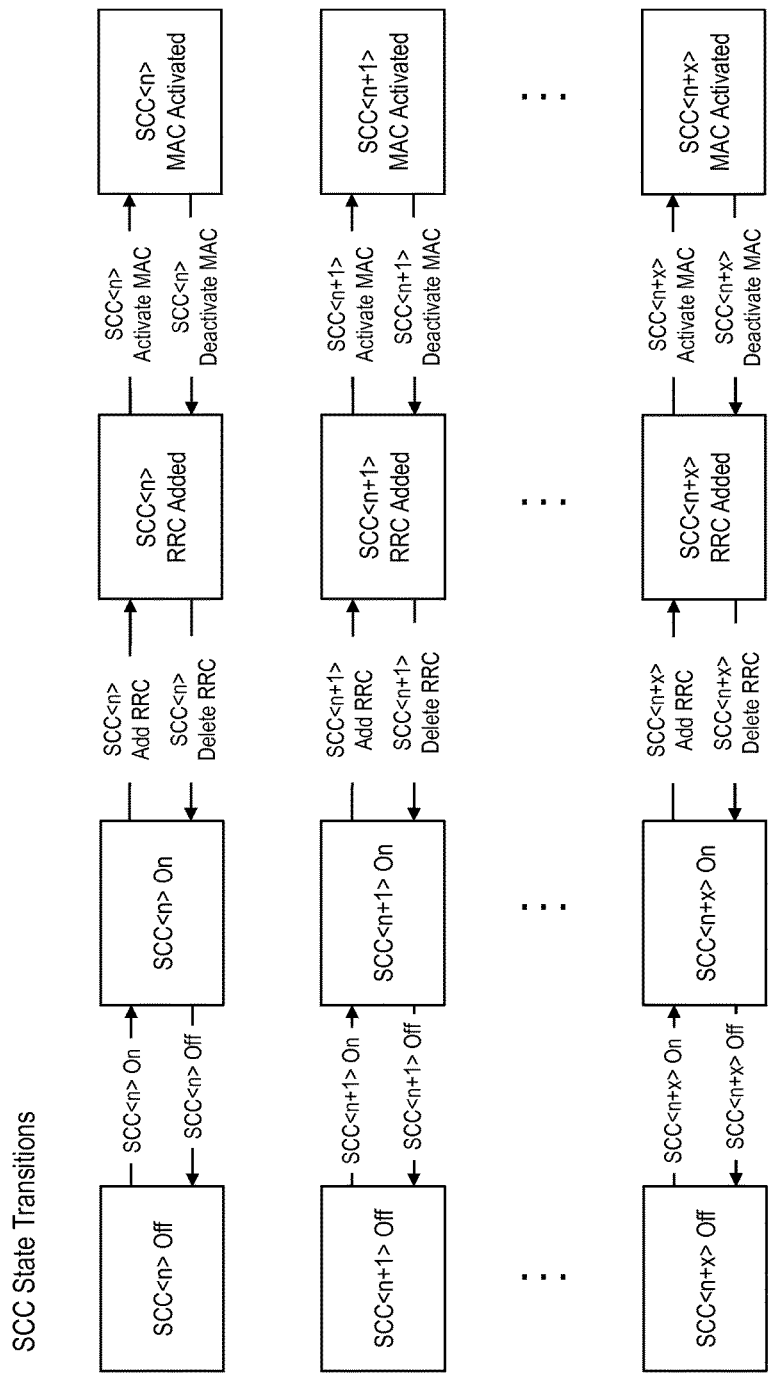
FIG. 8 illustrates a state diagram of different LTE protocol states.

Further, the control unit 9 controls the signal generator 7 to generate the carrier aggregation signal based upon user input registered by the input unit 6. By way of example, for performing a measurement, the carrier aggregation signal is activated and during the measurement, individual carrier signals can be activated and deactivated dynamically. It is not necessary to deactivate the carrier aggregation signal in order to activate or deactivate individual carriers. In the same manner, also parameters and protocol states of the individual carrier signals can be amended without terminating the measurement. For the example of an LTE advanced or LTE signal, above-mentioned protocol states are "off", "on", "RRC added", "MAC activated". A transition between these different protocol states is shown in FIG. 8. It is possible to set each carrier signal to one of the protocol states as desired by an operator of the measuring device 1.

Figure 3:
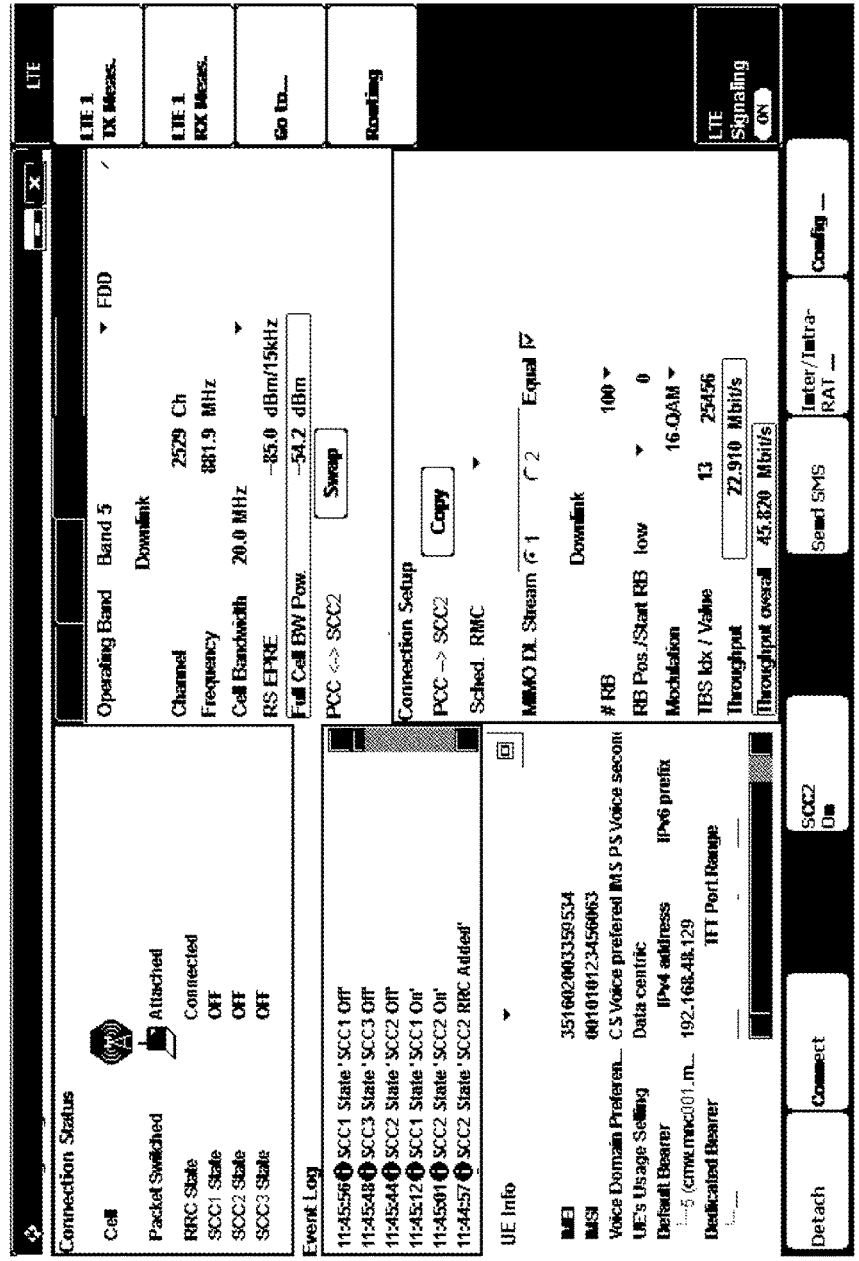
FIG. 3 illustrates a first example of the content of a display of the measuring device, in accordance with example embodiments of the present invention.

This can readily be seen in FIG. 3. FIG. 3 illustrates a first example of the content of a display of the measuring device, in accordance with example embodiments. With reference to FIG. 3, the carriers SCC1, SCC2 and SCC3 are all in the protocol state "off", while the carrier PCC is in the state "connected", indicated by the RRC state.

Figure 4:
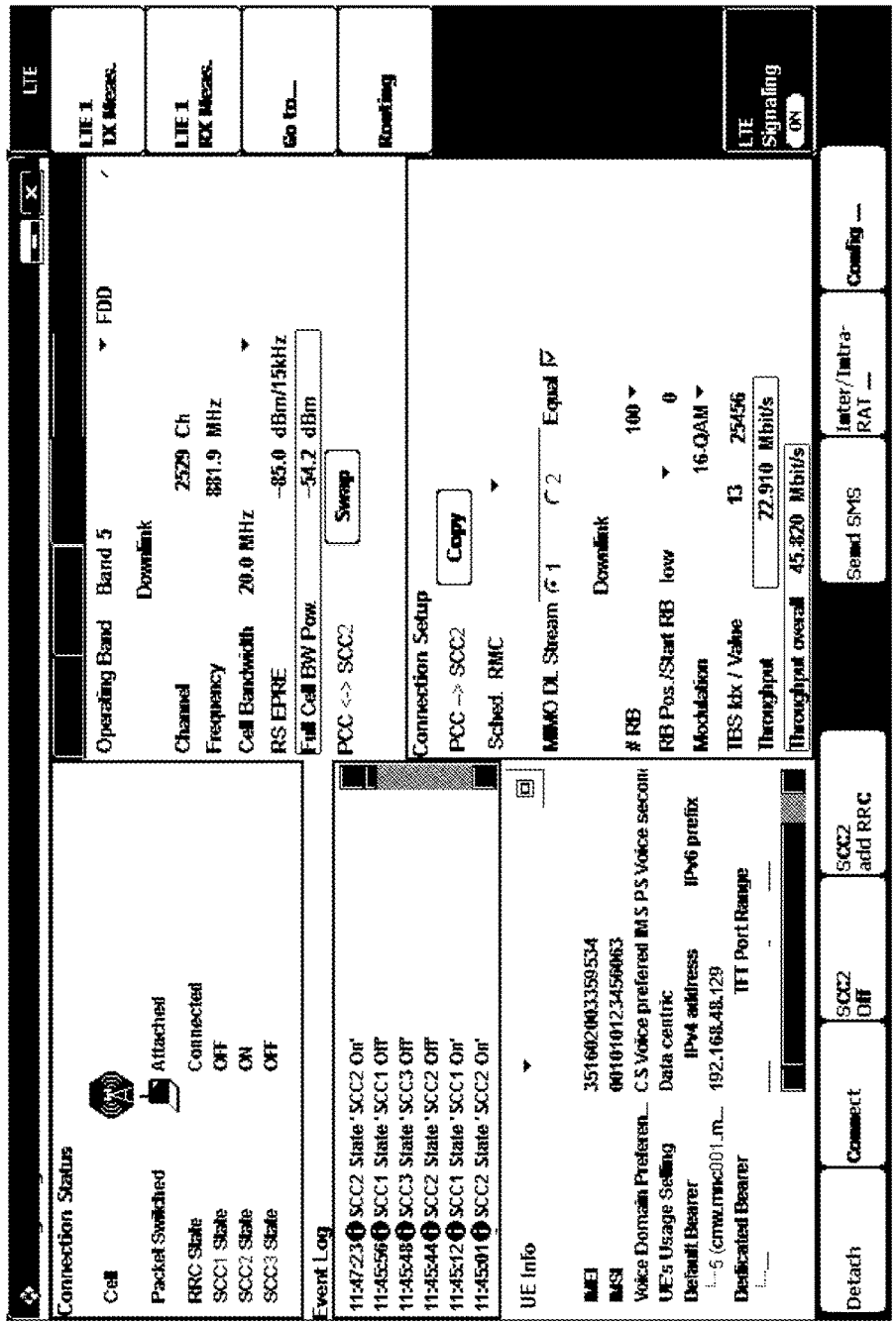
FIG. 4 illustrates a second example of the content of a display of the measuring device, in accordance with example embodiments of the present invention.

FIG. 4 illustrates a second example of the content of a display of the measuring device, in accordance with example. With reference to FIG. 4, the carrier SCC2 is now in the protocol state "on".

Figure 5:
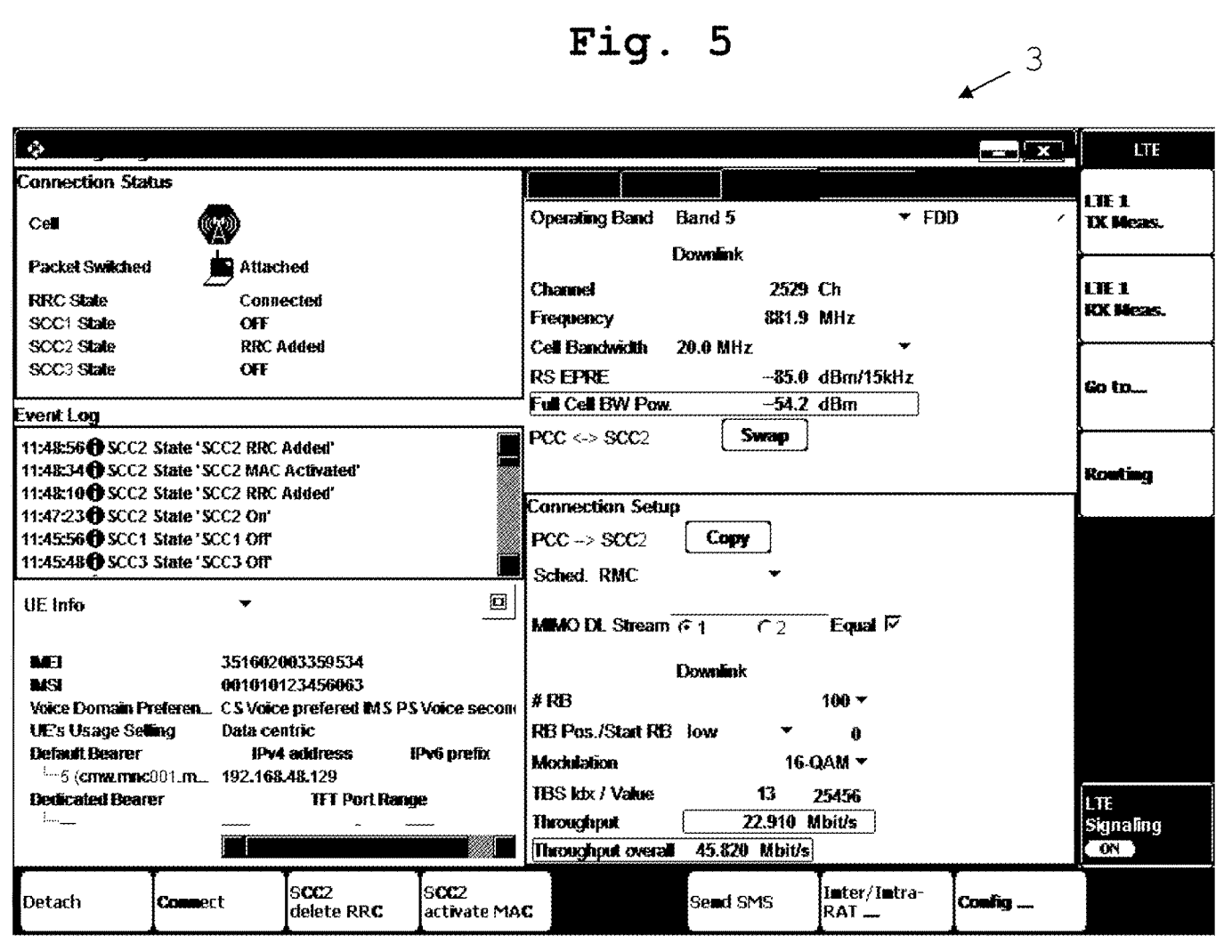

FIG. 5 illustrates a third example of the content of a display of the measuring device, in accordance with example embodiments. In FIG. 5, the situation after performing a further state transition is shown, where the carrier SCC2 is in the "RRC added" protocol state.

Figure 6:
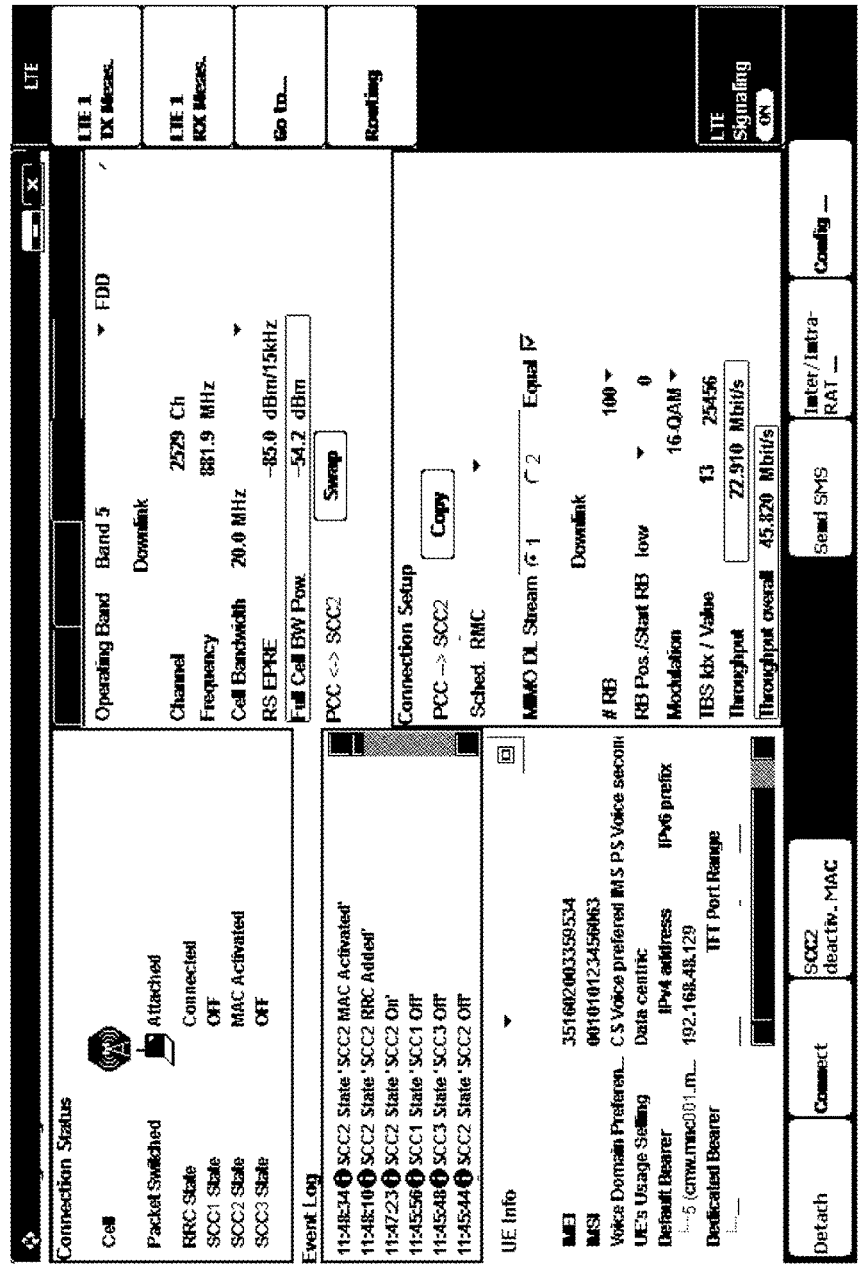
FIG. 6 illustrates a fourth example of the content of a display of the measuring device, in accordance with example embodiments of the present invention.

FIG. 6 illustrates a fourth example of the content of a display of the measuring device, in accordance with example embodiments. In FIG. 6, finally the SCC2 protocol state is "MAC activated", which corresponds to a fully activated and data transmission ready carrier.

Figure 7:
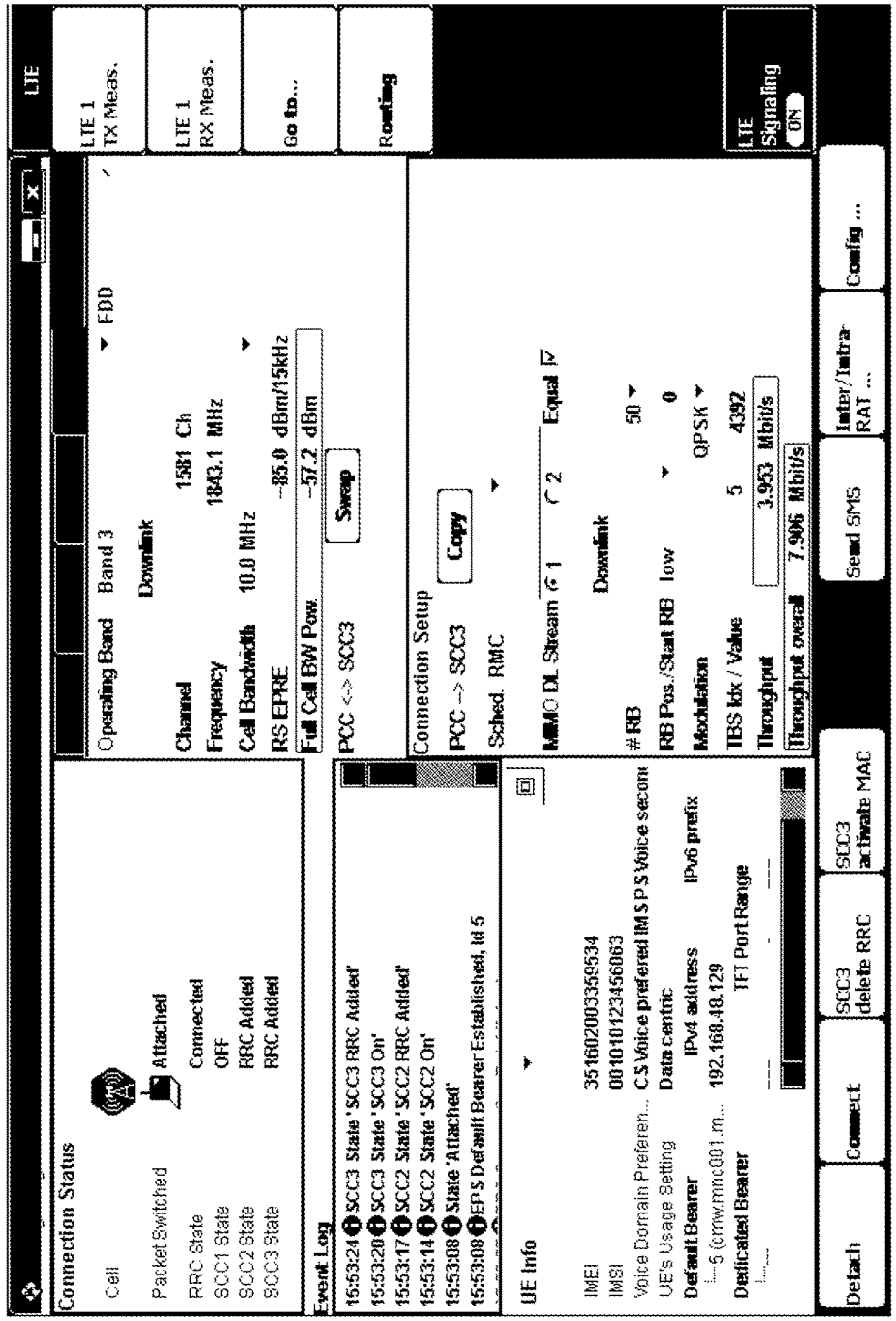
FIG. 7 illustrates a fifth example of the content of a display of the measuring device, in accordance with example embodiments of the present invention.

FIG. 7 illustrates a fifth example of the content of a display of the measuring device, in accordance with example embodiments. In FIG. 7, three activated carriers, one carrier PCC in the protocol state "Connected" and the carriers SCC2 and SCC3 in the protocol state "RRC added" are shown.

FIG. 8 illustrates a state diagram of different LTE protocol states, where state transitions between the different protocol states are shown in a flow diagram. From a protocol state "off", a state transition to a protocol state "on" is possible. From there, a transition to a state "RRC added" is possible. From there, a transition to a state "MAC activated" is possible. For each of the earlier described state transitions, also a reverse state transition is possible. Here, these chains of stated transitions and states are shown for a plurality of different carriers SCC <n>–SCC<n+x>.

Figure 9:
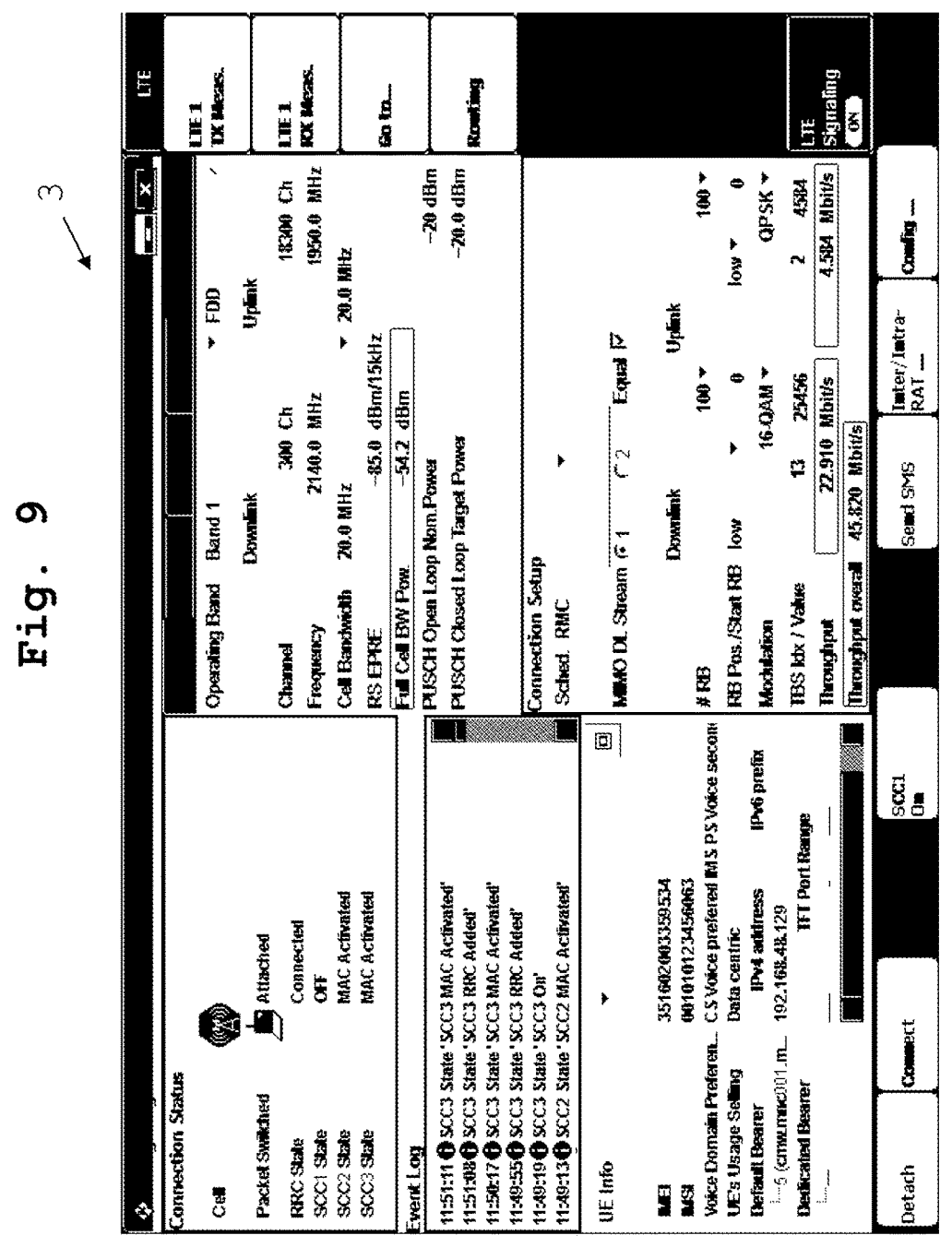
Figure 10:
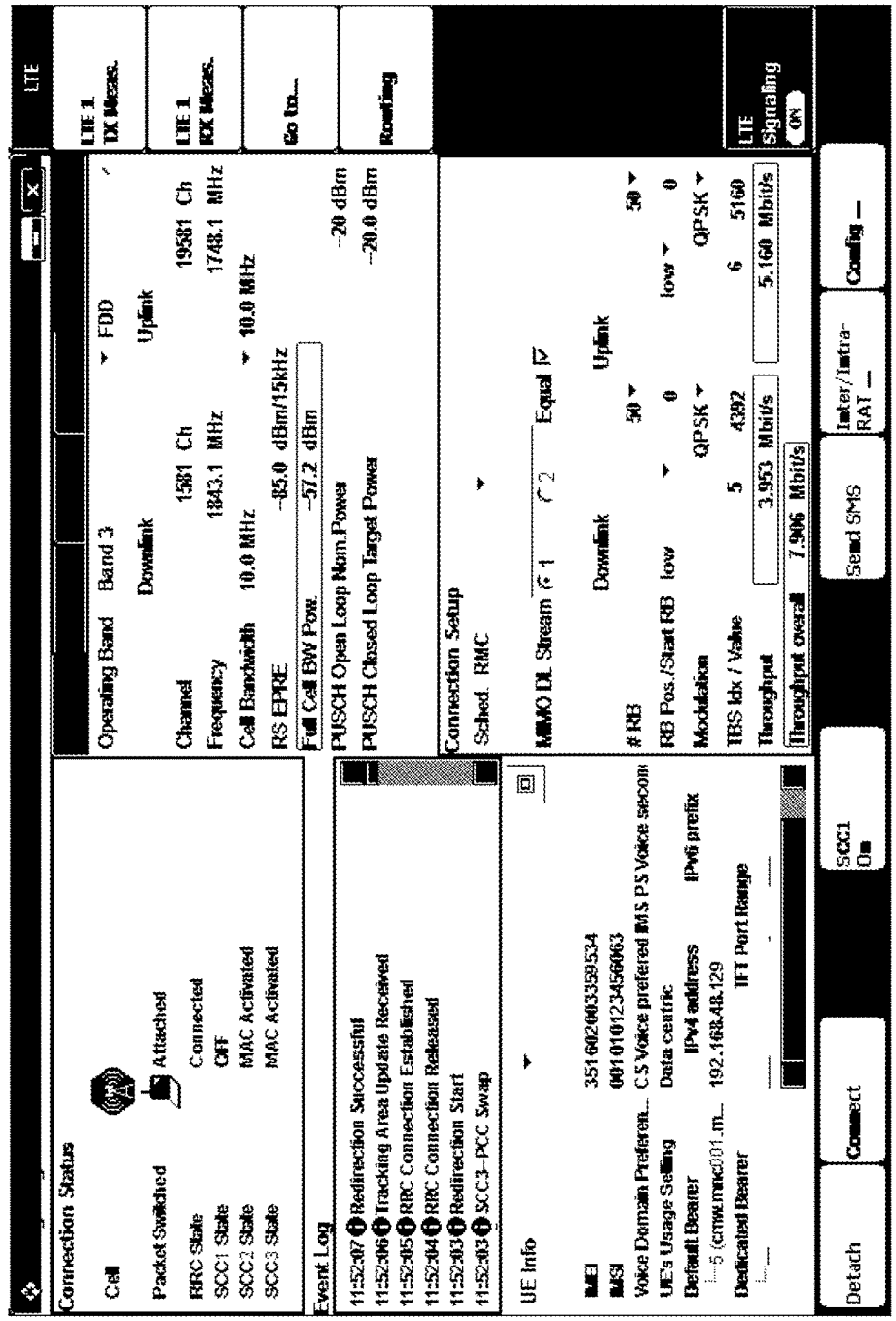
FIG. 10 illustrates a seventh example of the content of a display of the measuring device, in accordance with example embodiments of the present invention.

Moreover, the parameters of different carriers can easily be exchanged. If a user input suggesting an exchange of parameters between different active carriers is registered, such a parameter exchange is performed. FIG. 9 illustrates a sixth example of the content of a display of the measuring device, in accordance with example embodiments, where the parameters of the carrier PCC before a parameter exchange are shown. Further, FIG. 10 illustrates a seventh example of the content of a display of the measuring device, in accordance with example embodiments, where the situation after this exchange is shown.

Figure 11:
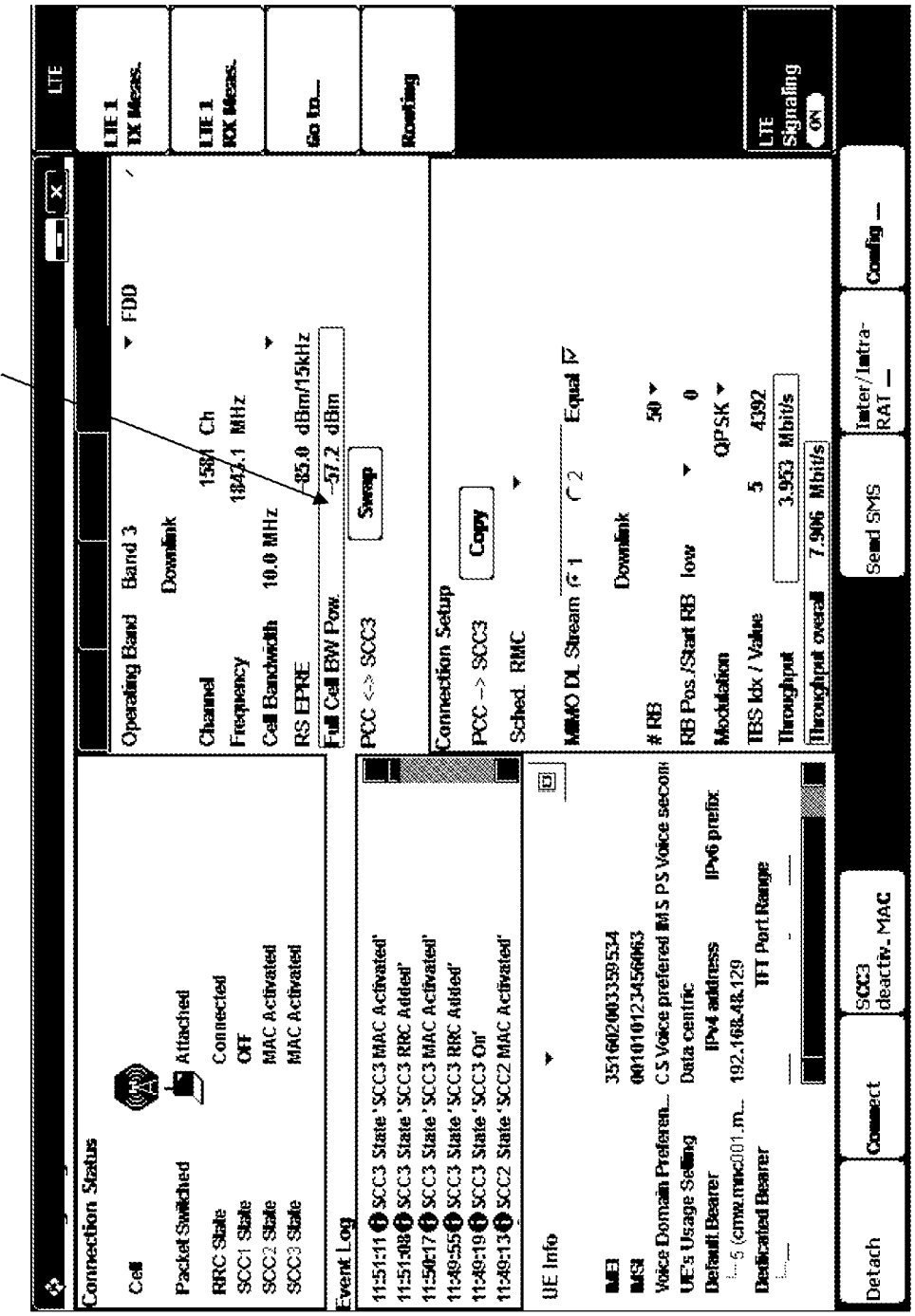
FIG. 11 illustrates an eighth example of the content of a display of the measuring device, in accordance with example embodiments of the present invention.
Figure 12:
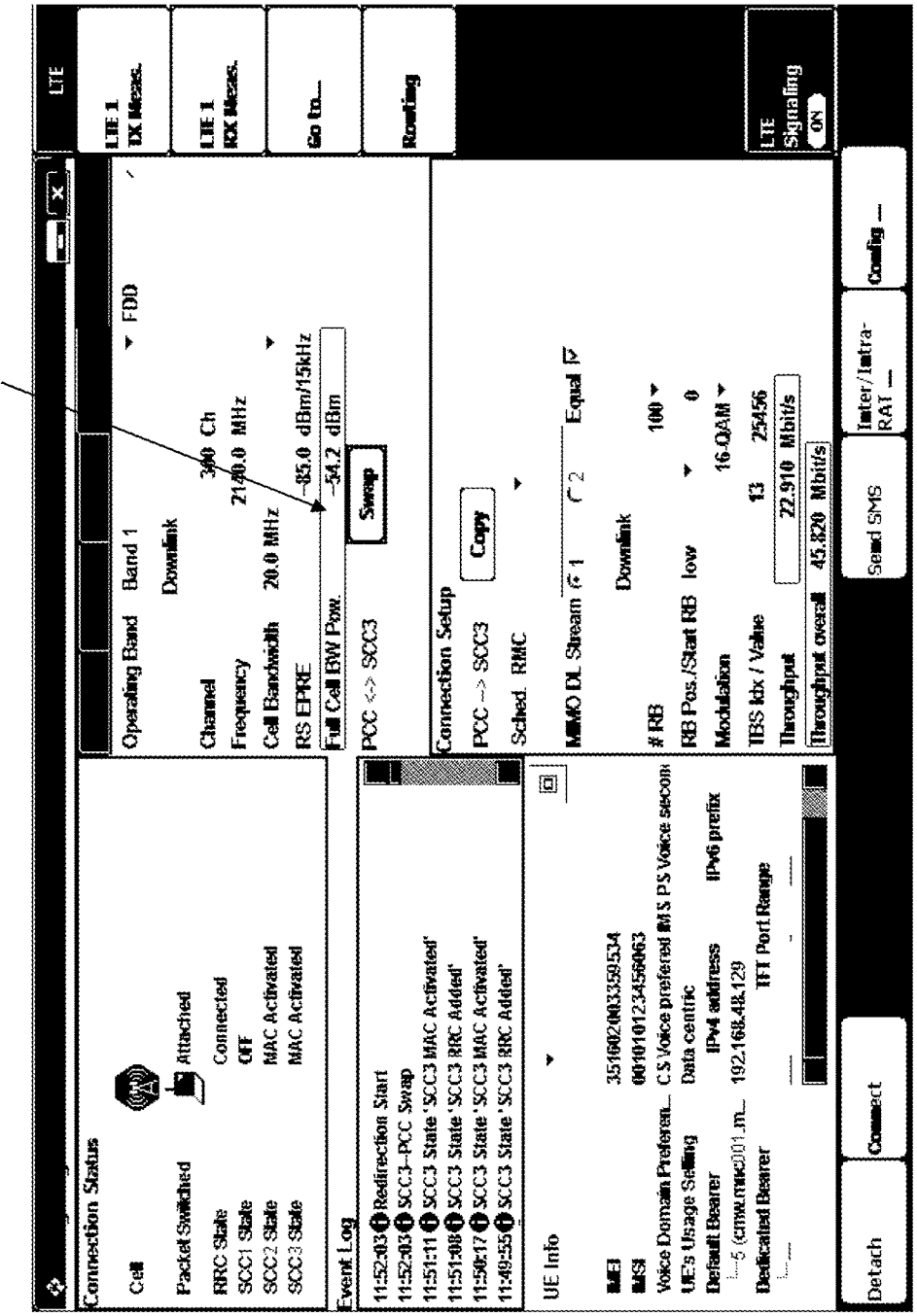
FIG. 12 illustrates a ninth example of the content of a display of the measuring device, in accordance with example embodiments of the present invention.

FIG. 11 illustrates an eighth example of the content of a display of the measuring device, and FIG. 12 illustrates a ninth example of the content of a display of the measuring device, in accordance with example embodiments. With reference to FIGS. 11 and 12, a parameter exchange of the SCC channel is shown. FIG. 11 depicts the situation before the exchange, and FIG. 12 depicts the situation after the respective parameter exchange. The parameter exchange is initiated by a user input, for example by pressing the button "swap" 10.

Figure 13:
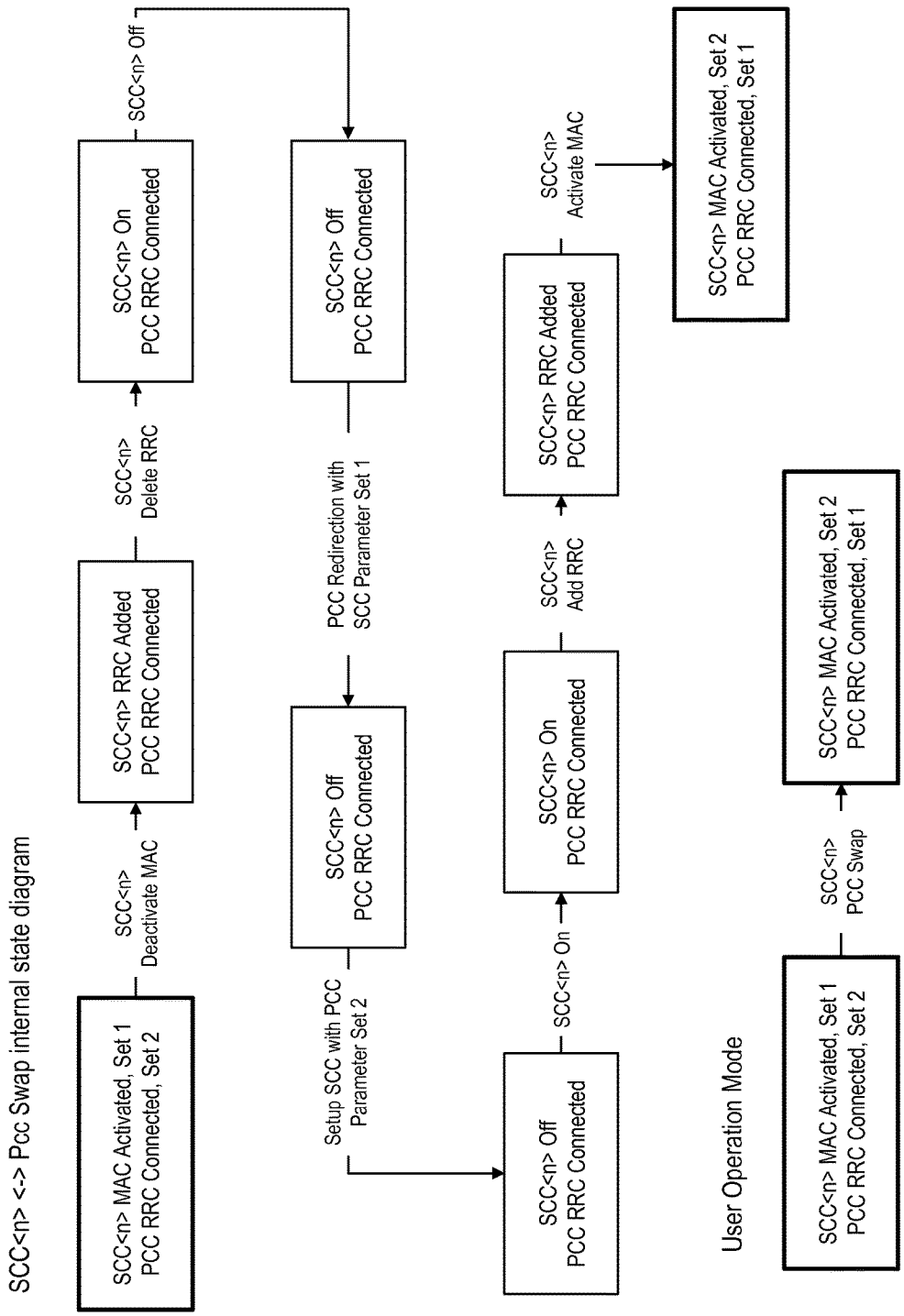
FIG. 13 illustrates an internal state diagram reflecting the performance of a parameter switching, in accordance with example embodiments of the present invention.

FIG. 13 illustrates an internal state diagram reflecting the performance of a parameter switching, in accordance with example embodiments, where the necessary internal protocol state transitions for performing a parameter exchange are shown. The parameters of channel SCC<n> starting in the "MAC activated" state and a PCC carrier starting in the "RRC connected" state are to be exchanged. By way of example, the carrier SCC<n> is first moved to the "RRC added" state. the carrier SCC<n> is then moved to the "on" state and then to the "off" state. A redirection of the PCC carrier with the SCC parameter set 1 is then performed. Subsequently, the SCC carrier is set up with the PCC parameter set 2. Starting from the "off" state, it is transitioned to the "on" state and then to the "RRC added" state and then to the "MAC activated" state. Now both carriers SCC and PCC are in the same state as before, but have exchanged the respective parameter sets. From a user perspective though, these individual state changes do not have to be instructed. It suffices that the user selects a parameter exchange, for example by hitting the bottom "swap" 10 as can be seen in FIGS. 11 and 12. All the above stated transitions are then performed automatically.

Figure 14:
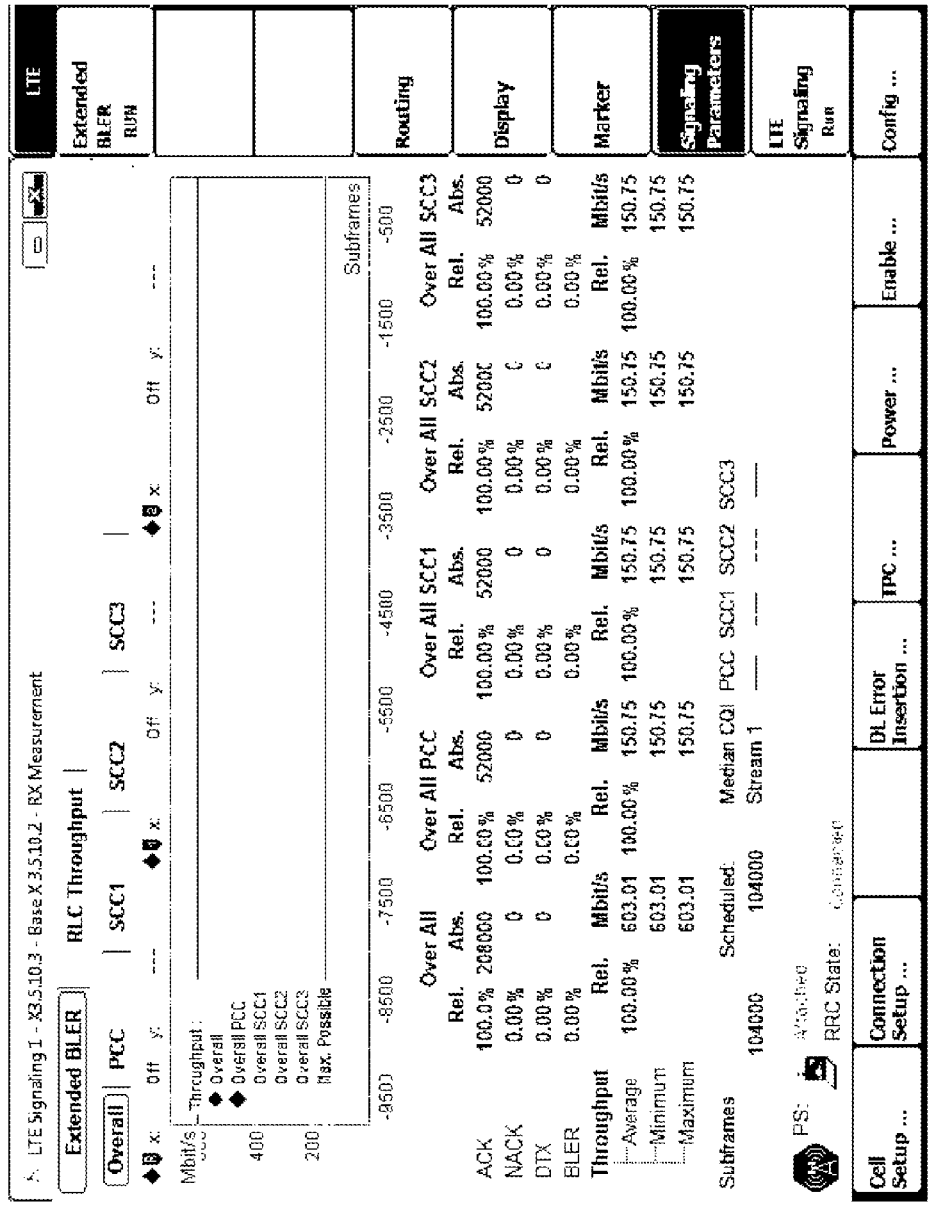
FIG. 14 illustrates a tenth example of the content of a display of the measuring device, in accordance with example embodiments of the present invention.
Figure 15:
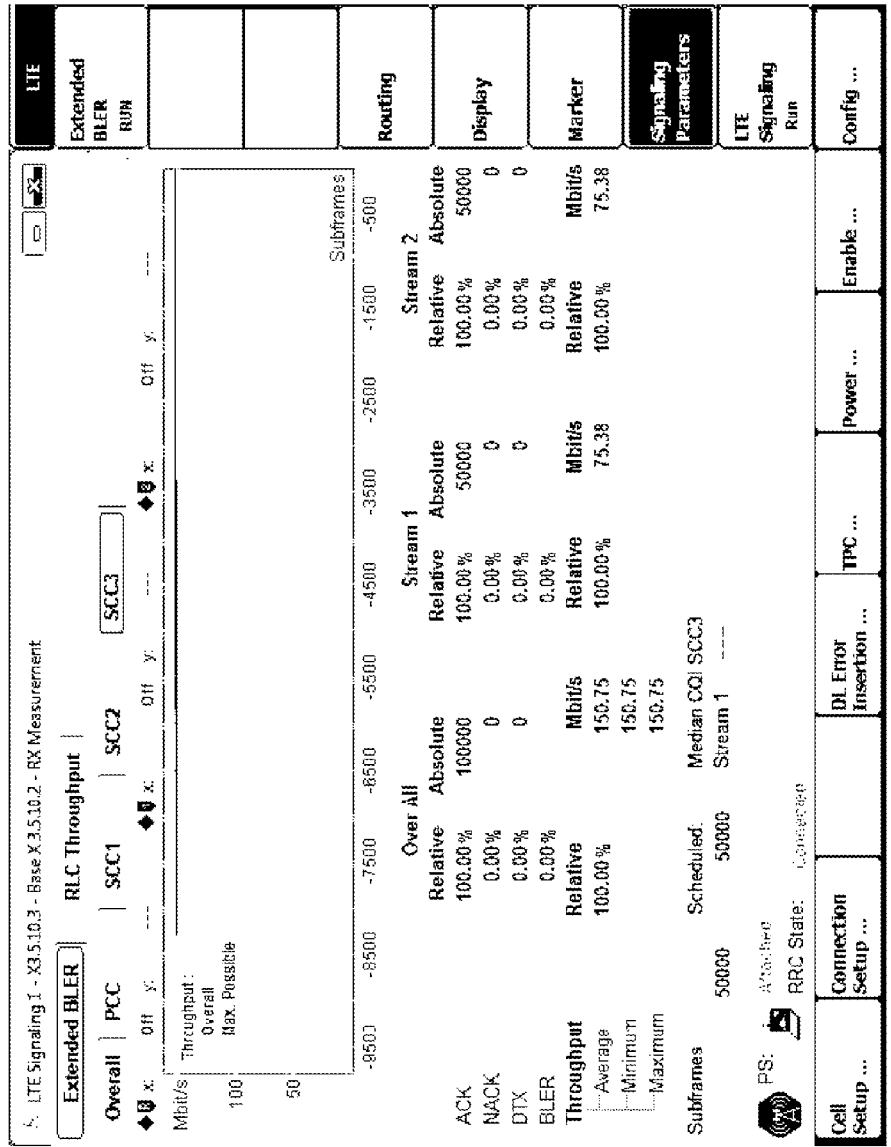
FIG. 15 illustrates an eleventh example of the content of a display of the measuring device, in accordance with example embodiments of the present invention.

FIG. 14 illustrates a tenth example of the content of a display of the measuring device, in accordance with example embodiments, where measuring results are displayed on the display 3. With reference to FIG. 14, overall measuring results of all carriers are shown in an aggregated manner. Alternatively, the measuring results can also be displayed by carrier, for example, as shown in FIG. 15. FIG. 15 illustrates an eleventh example of the content of a display of the measuring device, in accordance with example embodiments, where only the measuring results of carrier SCC3 are displayed.

Figure 16:
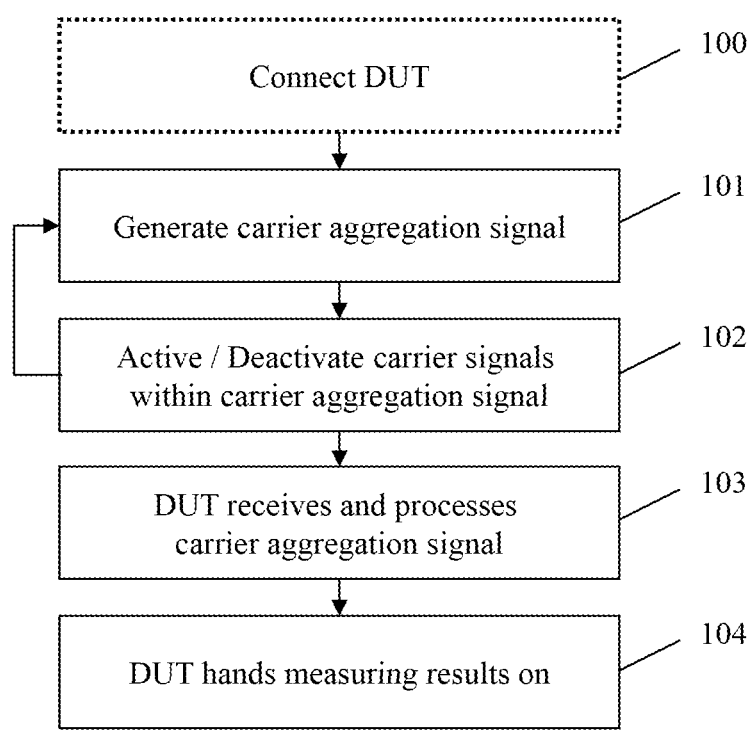
FIG. 16 illustrates a flow chart depicting a method for measuring a response of a device under test to a carrier aggregation signal, in accordance with example embodiments of the present invention.

FIG. 16 illustrates a flow chart depicting a method for measuring a response of a device under test to a carrier aggregation signal, in accordance with example embodiments. In an optional first step, the device under test is connected to a respective measuring device. In a second step 101, a carrier aggregation signal comprising one or more carrier signals is generated and handed to the device under test. In a third step 102, individual carrier signals within the carrier aggregation signal are activated or deactivated. Additionally or alternatively, also parameters or protocol states of the individual carrier signals within the carrier aggregation signal can be configured in this step, as described earlier. In a fourth step 103, the DUT receives and processes the resulting carrier aggregation signal and hands on measuring results in a fifth step 104. Regarding details of the implementation of each of the individual steps of the measuring method, it is also referred to the respective elaborations regarding the measuring device.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to the communications standard LTE or LTE advanced. The invention discussed above can be applied to many communications standards. The characteristics of the exemplary embodiments can be used in any combination.

Although the present invention and its advantages have been described in detail, it should be understood, that various changes, substitutions and alterations can be made herein without departing from the spirit and scope of the invention as defined by the appended claims.

What is claimed is:

1. A measuring device for measuring a response of a device under test to a carrier aggregation signal, wherein the measuring device comprises:
    a signal generator configured to generate the carrier aggregation signal, wherein the carrier aggregation signal comprises one or more of a first carrier signal and a second carrier signal; and
    a controller configured to control the signal generator to selectably, individually and dynamically, activate and deactivate the carrier signals within the carrier aggregation signal; and
    wherein the controller is further configured to control the signal generator to selectably and individually activate and deactivate the carrier signals within the carrier aggregation signal during a measurement without completely deactivating the carrier aggregation signal.

2. The device of claim 1, wherein the carrier aggregation signal is an LTE signal or an LTE advanced signal, and wherein protocol states of the carrier signals are Off, ON, RRC added, and MAC activated.

3. The device of claim 1, wherein the measuring device further comprises:
    an input interface configured to accept user input, and wherein the control unit controller is configured to control the signal generator based upon the user input.

4. The device of claim 3, wherein the measuring device further comprises:
    a display, wherein the controller is configured to control the display to display one of status information regarding at least one of the carrier signals, and information regarding a current user input.

5. The device of claim 3, wherein the controller is further configured to, based on the current user input, selectably switch between controlling the display to display status information regarding one of the carrier signals, and controlling the display to display aggregated status information regarding all carrier signals.

6. The device of claim 3, wherein the measuring device further comprises:
    a communications interface configured to communicate with the device under test, and to receive measuring results from the device under test.

7. The device of claim 6, wherein the measuring device further comprises:
    a display, wherein the controller is further configured to control the display to display the measuring results provided by the device under test.

8. The device of claim 1, wherein the carrier aggregation signal comprises one or more of a first carrier signal, a second carrier signal and a third carrier signal.

9. The device of claim 1, wherein the carrier aggregation signal comprises one or more of a first carrier signal, a second carrier signal, a third carrier signal and a fourth carrier signal.

10. A measuring device for measuring a response of a device under test to a carrier aggregation signal, wherein the measuring device comprises:
    a signal generator configured to generate the carrier aggregation signal, wherein the carrier aggregation signal comprises one or more of a first carrier signal and a second carrier signal; and
    a controller configured to control the signal generator to selectably, individually and dynamically activate and deactivate the carrier signals within the carrier aggregation signal; and
    wherein the controller is further configured to control the signal generator to selectably, individually and dynamically set protocol states or parameters of the carrier signals within the carrier aggregation signal, and
    wherein the controller is further configured to control the signal generator to selectably and individually set the protocol states or parameters of the carrier signals within the carrier aggregation signal during a measurement without completely deactivating the carrier aggregation signal.

11. The device of claim 10, wherein the carrier aggregation signal is an LTE signal or an LTE advanced signal, and wherein the protocol states of the carrier signals are Off, ON, RRC added, and MAC activated.

12. The device of claim 10, wherein the measuring device further comprises:
    an input interface configured to accept user input, and wherein the controller is configured to control the signal generator based upon the user input.

13. The device of claim 12, wherein the measuring device further comprises:
    a display, wherein the controller is configured to control the display to display one of status information regarding at least one of the carrier signals, and information regarding a current user input.

14. The device of claim 13, wherein the controller is further configured to, based on the current user input, selectably switch between controlling the display to display status information regarding one of the carrier signals, and controlling the display to display aggregated status information regarding all carrier signals.

15. The device of claim 10, wherein the measuring device further comprises:
    a communications interface configured to communicate with the device under test, and to receive measuring results from the device under test.

16. The device of claim 15, wherein the measuring device further comprises:
    a display, wherein the controller is further configured to control the display to display the measuring results provided by the device under test.

17. A measuring device for measuring a response of a device under test to a carrier aggregation signal, wherein the measuring device comprises:
    a signal generator configured to generate the carrier aggregation signal, wherein the carrier aggregation signal comprises one or more of a first carrier signal and a second carrier signal; and
    a controller configured to control the signal generator to selectably, individually and dynamically, activate and deactivate the carrier signals within the carrier aggregation signal
    wherein the first carrier signal comprises a first parameter set and the second carrier signal comprises a second parameter set, wherein the first parameter set and the second parameter set each comprises one of a carrier frequency, a carrier bandwidth, a carrier modulation scheme or a channel number, and wherein the controller is further configured to control the signal generator to selectably exchange at least part of the first parameter set of the first carrier and at least part of the second parameter set of the second carrier.

18. A method for measuring a response of a device under test to a carrier aggregation signal, wherein the carrier aggregation signal comprises one or more of a first carrier signal and a second carrier signal, and the method comprises:
- generating the carrier aggregation signal;
- selectably, individually and dynamically activating and deactivating the carrier signals within the carrier aggregation signal; and
- selectably and individually activating and deactivating the carrier signals within the carrier aggregation signal during a measurement without completely deactivating the carrier aggregation signal.

* * * * *

UNITED STATES PATENT AND TRADEMARK OFFICE
CERTIFICATE OF CORRECTION

PATENT NO. : 9,577,772 B2
APPLICATION NO. : 14/741765
DATED : February 21, 2017
INVENTOR(S) : Stefan Russ, Wolfgang Bleichner and Anne Stephan It is certified that error appears in the above-identified patent and that said Letters Patent is hereby corrected as shown below:

In the Claims

Column 9, Claim 6, Line 1 - the claim should depend from claim 1 (and not from claim 3).

Signed and Sealed this
Fifteenth Day of January, 2019

Andrei Iancu
*Director of the United States Patent and Trademark Office*